United States Patent [19]

Vidal et al.

[11] E Re. 29,774

[45] Reissued Sep. 19, 1978

[54] ELONGATED TEXTILE PRODUCT

[75] Inventors: Roger Vidal, Champagne; Raymond Gourmandy, Lyons, both of France

[73] Assignee: Rhone-Poulenc-Textile, Paris, France

[21] Appl. No.: 843,350

[22] Filed: Oct. 18, 1977

Related U.S. Patent Documents

Reissue of:

[64] Patent No.: 3,946,133
Issued: Mar. 23, 1976
Appl. No.: 427,344
Filed: Dec. 21, 1973

U.S. Applications:

[62] Division of Ser. No. 188,775, Oct. 13, 1971, Pat. No. 3,827,113.

[30] Foreign Application Priority Data

Oct. 15, 1970 [FR] France ..... 70.38079
Oct. 15, 1970 [FR] France ..... 70.38080
Jun. 22, 1971 [FR] France ..... 71.22959

[51] Int. Cl.[2] ..... D02G 1/20; D02G 3/02; D04H 17/00

[52] U.S. Cl. ..... 428/400; 57/140 R; 428/364

[58] Field of Search ..... 428/364, 400, 374, 369; 28/255; 57/140 K; 206/83.5, 388

[56] References Cited

U.S. PATENT DOCUMENTS

| | | | |
|---|---|---|---|
| 2,707,806 | 5/1955 | Wilkie | 206/83.5 |
| 2,798,348 | 7/1957 | Weber et al. | 206/83.5 |
| 3,340,585 | 9/1967 | Buckley et al. | 28/266 |
| 3,373,470 | 3/1968 | Joly | 28/255 |
| 3,409,956 | 11/1968 | Longbottom et al. | 28/255 |
| 3,438,105 | 4/1969 | Joly et al. | 28/255 |
| 3,644,969 | 2/1972 | Guillermin et al. | 28/255 |
| 3,703,754 | 11/1972 | Blanc et al. | 28/255 |

*Primary Examiner*—Lorraine T. Kendell
*Attorney, Agent, or Firm*—Sherman & Shalloway

[57] ABSTRACT

A process for simultaneously texturizing a plurality of yarns including feeding a plurality of yarns separately through the inlet of a texturizing device to a cylindrical chamber, supplying a hot compressed fluid to the cylindrical chamber to advance the yarns therein, the hot compressed fluid escaping into an outer closed chamber, and maintaining the outer chamber at a pressure less than the feed pressure of the hot compressed fluid and greater than atmospheric pressure. A texturizing device for use in the above described process including a yarn supplying conduit and an intake member combined to form a suction nozzle supplying a plurality of yarns to be texturized to a cylindrical chamber defined by a tubular member with a wall surrounding the tubular member forming a closed chamber maintained at a pressure less than the feed pressure of a hot, compressed fluid supplied to the intake member and greater than atmospheric pressure, the yarn supplying conduit having tubular channels therein to maintain the yarns separate during introduction into the cylindrical chamber. A textile product formed of an elongated pack of at least two texturized yarns having a substantially smooth, uniform, continuous, peripheral surface.

2 Claims, 2 Drawing Figures

ELONGATED TEXTILE PRODUCT

Matter enclosed in heavy brackets [ ] appears in the original patent but forms no part of this reissue specification; matter printed in italics indicates the additions made by reissue.

This is a division of application Ser. No. 188,775, filed Oct. 13, 1971 now Pat. No. 3,827,113.

BACKGROUND OF THE INVENTION

1. Field of the Invention:

The present invention pertains to a process and apparatus for high speed texturizing of thermoplastic yarns and, more particular, to such process and apparatus for simultaneously texturizing a plurality of thermoplastic yarns and to the product produced thereby.

2. Discussion of the Prior Art:

In the past a great number of processes have been utilized to produce springy texturized yarn with such prior art processes being specifically described in the above mentioned patent application Ser. No. 56,880, now U.S. Pat. No. 3,703,754, the specification of which is incorporated herein by reference. In order to more fully appreciate the present invention, however, prior art texturizing processes will be briefly described hereinafter.

The false twist process, which is an example of a mechanical texturizing process, is utilized for texturizing by subjecting a yarn to an excess twist that is thermally fixed and then continuously untwisting the yarn. Another mechanical texturizing process is stuffing wherein a heated yarn is compressed in a stuffing box in which it remains for varying lengths of time. The mechanical texturizing processes as described above have the disadvantage of permitting only relatively low rates of production and, therefore, have not been as commercially feasible as is desirable.

U.S. Pat. No. 3,373,470 describes a texturizing process that permits high rates of production on the order of 1,000 meters per minute or greater by compacting and compressing yarns in a limited space by means of a hot fluid under pressure. One portion of the fluid is permitted to escape laterally while the remaining portion of the fluid effects the advance of the packed yarn within the limited space. The apparatus utilized to effect the process of U.S. Pat. No. 3,373,470 basically includes a suction nozzle having a yarn passage extending therethrough and a pipe for delivering the hot fluid. A tubular chamber communicates with a nozzle receiving the hot fluid and the yarn, and the tubular chamber has gaps in its lateral wall to permit escape of the fluid. The process of Pat. No. 3,373,470 is particularly effective in texturizing of high tex yarns, such as carpet yarns, and medium tex yarns, and this process is presently commercially utilized for texturizing yarns above 500 dtex.

The process and apparatus of U.S. Pat. No. 3,373,470 cannot be easily utilized to texturize fine yarns, that is yarns below 100 dtex, in that the dimensions of the apparatus must be reduced to the size of the yarn to be treated. Accordingly, in order to utilize this process for fine yarns the apparatus must be miniaturized which, of course, involves the disadvantages of precise machining and design of the gaps or piercing of the lateral escape holes for the fluid. In many cases the diameter of such escape holes must be on the order of 0.1mm. The provision of such small holes without leaving burrs inside the tubular chamber is an extremely difficult operation and from an economic standpoint is improper.

The process of U.S. Pat. No. 3,373,470 has been utilized to assemble and texturize simultaneously two or more 500 dtex yarns by feeding several filament lengths together to the input of the texturizing device. At the output of the device a pack formed of a curling or crimped yarn, whose number of filaments is the sum of the number of filaments introduced into the device, is collected, the pack being normally collected in a skip or can. When the treated yarns are on the order of 500 dtex, it is possible to separate the different yarns in the pack without great difficulty since the yarns have a relatively high tex and are, accordingly, relatively heavy. Of course, the yarns have a tendency to stick or cling together, however, in the case of high titre yarns, when the yarns are extracted or removed from the skip or can the yarns separate due to the weight of the pack. In contradistinction; however, when fine yarns are treated, such fine yarns have a tendency to cling together even if they are not texturized; and, thus when they are texturized, the interengagement due to the kinks is stronger and is capable of resisting the effect of the weight of the pack. Accordingly, separation of the yarns is extremely difficult; and, of course, the degree of difficulty increases with the decrease in titre or increase in fineness of the texturized yarns. Furthermore, in certain applications the pack of texturized yarns after collection in a skip or can is subjected to additional treatments such as passage through a dye bath. During such additional treatments or operations the pack is subjected to movement which exposes the pack to deformation that could cause the pack to loose cohesion and its original configuration, such as crushing for example. If such deformation occurs, the difficulty in separating the yarns from the pack is greatly increased since the yarns are meshed and cling to each other with increased tenacity.

To increase consistency and firmness of packs produced by the above processes an auxiliary yarn has been introduced into the texturizing device along with the yarn to be treated. The auxiliary yarn is fed at a slower speed than the yarn to be treated and constitutes a core imparting firmness to the pack. The use of such an auxiliary yarn has the disadvantage of requiring the delivery of a further element to the texturizing device, which element must then be removed from the pack by chemical, physical or mechanical means. Another manner in which it has been attempted to increase consistency and firmness of the pack is to incorporate a binder in the yarn substance; however, this solution has the disadvantage of effectively providing a compromise between the firmness of the produced pack to facilitate further operations and the facility of extracting or separating the yarn from the pack for winding. Furthermore, the binder must be such as not to have a chemical or physical effect on the yarn such as bonding the strands since such an effect produces a yarn having irregular bulk or cross section.

Another problem in the separation of texturized yarns is that in the past separation was possible only at low speeds, and, thus, the entire process was slowed thereby. Of course, high speeds in the production of texturized yarns are greatly desirable.

SUMMARY OF THE INVENTION

Accordingly, it is an object of the present invention to provide a process and apparatus for simultaneously texturizing a plurality of yarns at high speeds and, more particularly, for simultaneously texturizing a plurality of fine yarns at high speeds to form a crimped pack from which the yarns may be easily and quickly separated.

The present invention is generally characterized in a process for simultaneously texturizing a plurality of yarns including feeding a plurality of yarns to a texturizing device including a fluid inlet, a nozzle communicating with a tubular member having lateral discharge apertures therein and a closed outer chamber surrounding the tubular member; supplying a hot compressed fluid to the fluid inlet of the texturizing device, one portion of the fluid advancing the yarns through the tubular member and another portion of the fluid escaping laterally through the discharge apertures; and maintaining the pressure in the outer chamber less than the pressure of the fluid and greater than atmospheric pressure. The present invention is further generally characterized in a texturizing device including a tubular member for receiving a plurality of yarns and having lateral discharge apertures therein, a closed outer chamber surrounding the tubular member, a fluid inlet for receiving a hot compressed fluid, and a yarn inlet having a plurality of channels therein, each of the channels receiving a yarn to be texturized, one portion of the fluid advancing the yarns through the tubular member and another portion of the fluid escaping laterally through the discharge apertures into the outer chamber, the outer chamber having a pressure therein less than the pressure of the fluid at the fluid inlet and greater than atmospheric pressure. The present invention is additionally generally characterized in a product formed with the above described process and apparatus including an elongated pack of at least two crimped yarns having a substantially smooth, uniform and continuous outer peripheral surface.

The present invention has another object in that at least two yarns to be crimped are introduced separately into a limited space substantially along the generatrix thereof with the yarns being texturized by compressed fluid, one portion of which escapes laterally from the limited space and the other portion of which effects advancement of the yarn.

A further object of the present invention is to produce an elongated textile product formed of a compact packing of a least two texturized yarns with the peripheral portion of the packed product having a continuous, uniform and substantially smooth surface.

Yet another object of the present invention is to form a pack of texturized yarns with each yarn being disposed substantially along a generatrix of a limited space such that entanglement between strands of adjacent yarns is substantially reduced thereby facilitating separation of the yarns after texturizing.

A further object of the present invention is to maintain a plurality of yarns separate upstream of a texturizing device such that the yarns enter the texturizing device separately.

The present invention has another object in that a plurality of yarns are texturized in a limited space having a circuit cross section in order to produce a pack having a substantially cylindrical configuration.

A further object of the present invention is to provide a method of texturizing and separating a plurality of yarns either continuously after texturizing or some time thereafter wherein the rate of separation depends only on the speed at which the texturized yarn is wound.

Some of the advantages of the present invention are that the number of yarns which may be treated is a function of both titre of the yarns and the dimensions of the device, in practice this number being advantageously between 4 and 8 or higher; a pack of yarns treated according to the present invention has sufficient cohesion to permit preservation of configuration during movement in a skip or can; the load-to-rupture, that is the load that must be applied to the pack to break its cohesion in a longitudinal direction as evidenced by cracks that distort the uniformity of the peripheral surface, corresponds to the weight of a length of the product greater than one meter; when polyamide yarns are treated, the specific weight of the pack is greater than 0.3 g/cc; the firmness and appearance of the pack render it useful as a semi-finished product able to withstand the rigors of transport over long distances and to be delivered as is to customers; after texturizing the pack can be collected in a conventional manner either in a can or skip for dying and also may be suitably packaged for delivery to a manufacturer; the pack may be collected by winding the pack on a support such as a cable or a cord; the yarns of the pack may be separated either immediately or continuously after texturizing or at some later period in time after further treatment or movement such as in the course of workup on a machine; for use in knitting where the rate of take-off of the yarn is slow, the pack may be utilized directly with yarn being separated from the pack in the course of take-off of the yarn; the yarns may be wound individually on a winding support or, preferably, after separation of the yarns may be assembled either in several groups or a single group and wound simultaneously, preferably in parallel; and the rate of separation of yarns is limited only by the rate of winding.

Other objects and advantages of the present invention will become apparent from the following description of the preferred embodiments taken in conjunction with the accompanying drawings.

DESCRIPTION OF THE PREFERRED EMBODIMENTS

Figure 1:
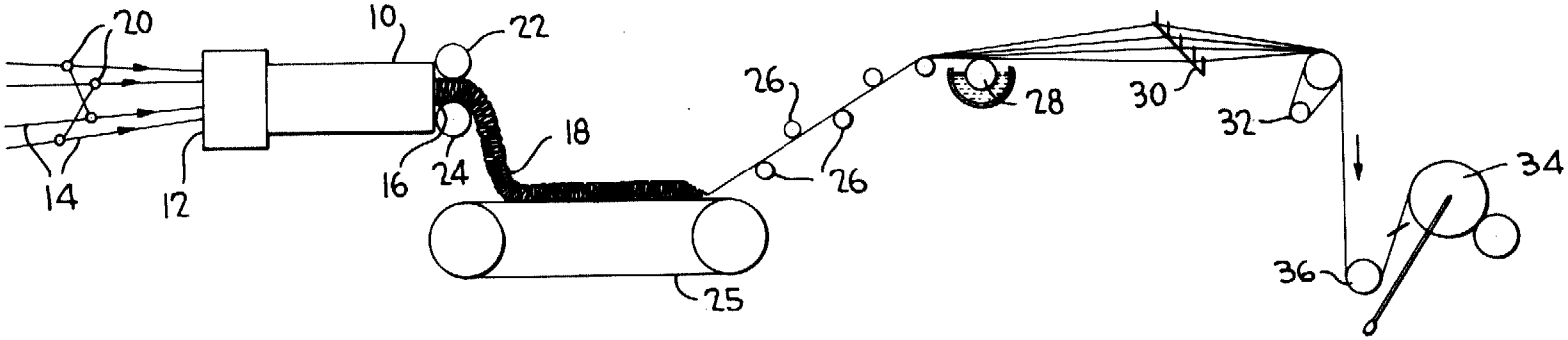
FIG. 1 is a diagrammatic representation of apparatus according to the present invention.

Apparatus according to the present invention is illustrated in FIG. 1 and includes a texturizing device 10 having a yarn inlet 12 for separately receiving a plurality of yarns 14 to be treated and an outlet 16 for dispensing a pack 18 of the crimped or curled yarns 14 after texturizing by device 10. A plurality of guides 20 are disposed upstream of inlet 12 to guide yarns 14 individually from feed spools, not shown, to device 10 in order to assure that the yarns are separately received at the inlet 12.

The rate of movement of pack 18 from outlet 16 is controlled by a pair of rolls 22 and 24 disposed adjacent the outlet, and pack 18 is delivered to a moving endless belt 25 which carries the pack to a plurality of lift devices 26. From lift devices 26 the yarns of the pack, which are beginning to separate, are moved past a lubricating roll 28 and a separating comb 30 to a delivery mechanism 32 that delivers the yarns to a peripheral drive winding device 34 under tension controlled by a tension regulator 36.

Figure 2:
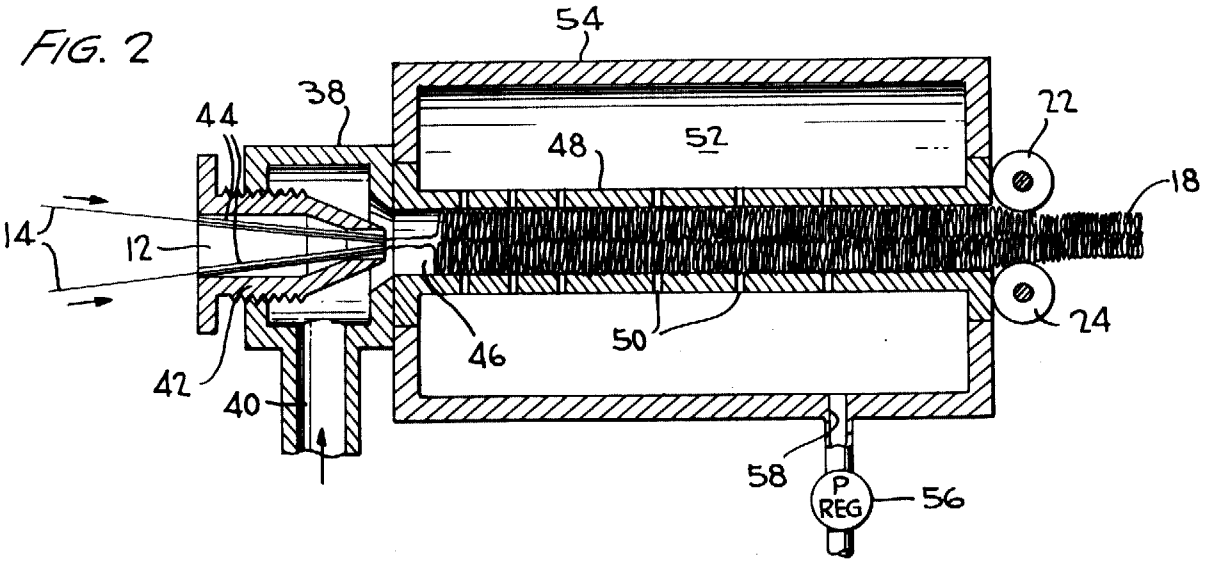
FIG. 2 is a side elevation in section of the texturizing device of FIG. 1.

Texturizing device 10, as shown in FIG. 2, includes a nozzle assembly formed of an intake member 38 receiving hot compressed fluid, such as steam, at a fluid inlet 40 and a yarn delivery conduit 42 having a tapered end cooperating and aligned with a conical opening in intake member 38 to form a suction nozzle. Conduit 42 threadedly engages member 38 to permit orifice adjustment. The inlet of conduit 42 defines yarn inlet 12, and a plurality of tubular channels or passages 44 are formed in conduit 42 to receive individual yarns 14 and deliver the yarns separately to a cylindrical chamber 46 formed by a tubular member 48, which chamber 46 defines a limited space communicating with the suction nozzle and conduit 42 to receive hot, compressed fluid and the plurality of yarns 14.

Tubular member 48 has a plurality of apertures 50 spaced longitudinally therein, and apertures 50 provide communication between cylindrical chamber 46 and a closed outer chamber 52 which is defined by a concentric wall 54 surrounding tubular member 48. A pressure regulator 56 is positioned at an outlet port 58 in order to control the pressure in chamber 52 and maintain such pressure above atmospheric pressure during operation.

In operation the yarns 14 are supplied to the inlet 12 of the nozzle and are pulled into chamber 46 by the hot, compressed fluid, preferably saturated steam, supplied at inlet 40. The hot, compressed fluid serves to effect movement or advancement of the yarns 14 in chamber 46 as well as performing a curling or crimping function at the orifice and stuffing chamber 46 with the yarns. The hot, compressed fluid escapes laterally in a controlled manner into chamber 52 since the pressure in chamber 52 is maintained above atmospheric pressure. The egress rate of the pack 18 formed by texturizing device 10 is controlled by rollers 22 and 24; and, after exit may be delivered to conveyor 25 for continuous separation of the yarns. That is, the yarns experience winding tension as they approach the lift devices 26 and begin to separate. The yarns are then lubricated by roll 28 and separation is completed as the yarns pass through comb 30. The separated yarns are then wound under tension by winding device 34 in a parallel configuration. Thus, utilizing the apparatus of FIG. 1 a process is provided for continuously crimping a plurality of yarns to form a pack 18 and then separating the yarns for winding.

If desired, the pack 18 may be collected in a can provided with a reciprocating motion, and the yarns may be separated and wound at any time thereafter with the pack 18 providing a firm and stable product. The yarns in pack 18 may be easily separated in the same manner as described with reference to FIG. 1 at any time after the pack is formed; and, accordingly, the pack may be shipped as a product for separation at a later time immediately before use in a suitable textile operation.

The process, product and apparatus of the present invention will be described with reference to the following specific examples; however, it is understood that the following examples are presented for purposes of illustration only and the present invention is not meant to be limited thereto.

The examples 1 and 2 were accomplished with winding of the yarn in a relaxed state.

EXAMPLE 1

Using the texturizing device of FIG. 2, four yarns, 44 dtex/13 strands, demi-matte, round section, are introduced separately into the tubular texturizing chamber 46 which is 110mm long and 3mm in diameter. The operating conditions are as follows:

rate of yarn feed: 1000m/min.
steam feed pressure at the nozzle: 7 bars
escape pressure in the closed chamber 52: 3.6 bars The pack is collected in a can, and separation and winding is effected discontinuously with:

rate of delivery mechanism 32: 900m/min.
rate of winding: 780 m/min.

Four texturized yarns are obtained, each having the following characteristics:

bulk (according to the Koning test): 3.3 cc/g
curl in half waves to the centimeter: 15
elasticity: 44%

The elasticity was measured by the following test.

A ten meter sample of the yarn to be tested was treated for 5 minutes at 130° C in saturated steam, in a drying cabinet. Then a 50 cm length of yarn taken from this sample had applied to it a load of 0.045 g/dtex (0.05 g/denier) of the yarn before texturizing. A length $L_1$ was measured. The load was then replaced by another smaller load of 0.0009 g/dtex (0.001 g/den) of the yarn before texturizing. This load was maintained for one hour, and then a length $L_2$ was measured. The elasticity is given by the following formula:

$$\frac{L_1 - L_2}{L_2} \times 100$$

EXAMPLE 2

The apparatus of FIG. 1 is used, introducing separately 6 yarns, 78 dtex/23 strands, matte, round section, in the tubular texturizing chamber 46 having a length of 110mm and a diameter of 4mm.

The operating conditions are as follows:

rate of yarn feed: 600 m/min.
steam feed pressure at the nozzle: 7.5 bars
steam pressure in the closed chamber 52: 2.1 bars
average winding speed 520 m/min.

At the output, after separation, 6 texturized yarns are obtained, each having the following characteristics:

bulk (according to the Koning test): 3.06 cc/g
curl in half waves to the centimeter: 13
elasticity: 24%

The elasticity was measured in the same manner as in example 1.

Examples 3 and 4 were effected with winding of the yarn under tension.

EXAMPLE 3

There are separately introduced into the texturizing device of FIG. 2 4 polyhexamethylene adipamide yarns, each yarn being constituted by assembly of a 78 dtex/23 strand yarn, semi-matte, round section, and a 78 dtex/23 strand yarn, glossy, multilobed section. The texturizing tubular chamber 46 has a length of 105mm and a diameter of 3mm.

The operating conditions are as follows:

rate of yarn feed: 1000 m/min.
steam feed pressure at the nozzle: 7 bars
escape pressure in the closed chamber 52: 2.5 bars Separation and winding are performed continuously:
rate of delivery mechanism 32: 920 m/min.
rate of winding: 890 m/min.
winding tension: 45 g A slight difference is maintained between the speed of the delivery mechanism 32 and the speed of winding to ensure greater regularity of the latter, though under tension.

There are obtained 4 mixed yarns which look practically flat, resembling the yarns before texturizing, each mixed yarn having the following characteristics:

| | Before Revelation | After Revelation |
|---|---|---|
| elasticity | 7% | 20% |
| bulk | 2.5cc/g | 6.5cc/g |
| curl in half wave per cm: | 7 | 14 |

Revelation is defined as revealing of the texturizing of the yarn after thermal treatments for finishing or dying articles composed of the yarns.

Bulk was measured according to the Koning test, and elasticity was measured in the manner of example 1. The mixed yarns thus prepared are used for making a knit on an interlock, gauge 20.13 stitches/cm. After knitting, the knitted product was steamed at 130° C for revelation of the yarn.

The knit has a slightly glossy mottled appearance, presenting a silky feel that contrasts with the dry feel of knits made from non-texturized synthetic yarns. Moreover, there is less puckering. The knit is used for manufacture of hosiery.

EXAMPLE 4

There are introduced separately into the device of FIG. 2 4 yarns each constituted by a 20 t/m twist of a 72 dtex/23 strand semi-matte round cut polyester yarn and a 78 dtex/23 strand glossy multilobed polyamide yarn. The tubular texturizing chamber 46 has a length of 105mm and a diameter of 4mm.

The operating conditions are as follows:
rate of yarn feed: 1000 m/min.
steam feed pressure at the nozzle: 6 bars
escape pressure in the closed chamber 52: 1.2 bars
Separation and winding are effected continuously:
speed of the delivery mechanism 32: 900 m/min.
winding rate: 880 m/min.
winding tension: 30 g Four mixed yarns are obtained, with practically flat appearance, like that of the yarns before texturizing, each mixed yarn presenting the following characteristics:

| | Before Revelation | After Revelation |
|---|---|---|
| elasticity | 3.5% | 13.3% |
| bulk | 2.5cc/g | 7 cc/g |
| curl, half wave to the centimeter | 5.5 | 12 |

These yarns are used for manufacture of outer clothing such as dresses, polo shirts, etc. and are very pleasant to wear.

EXAMPLE 5

Simultaneous texturizing of four lengths of polyhexamethylene adipamide (nylon 66) 100 dtex, 34 strands, which feed into the device of FIG. 2 with the tubular texturizing chamber 46 having a diameter of 3mm. The texturizing fluid is saturated steam. The operating conditions are as follows:
rate of yarn feed: 1000 m/min.
steam feed pressure at the nozzle: 8 bars
escape pressure in the enclosed chamber 52: 3.5 bars
rate of output of the pack: 22 m/min.

An elongated pack is obtained, substantially cylindrical in form, with a diameter varying from 2 to 3 mm over its length, and presenting a peripheral surface that is uniform and substantially smooth.

The specific weight of the pack is 0.59 g/cc. The necessary load for breaking the cohesion of the pack corresponds to the weight of a product length substantially equalling 3m.

EXAMPLE 6

With a device substantially the same as that of Example 1, four lengths of polyhexamethylene adipamide (nylon 66), 44 dtex/13 strands, are texturized. The texturizing fluid is saturated steam. The operating conditions are as follows:
rate of yarn feed: 1000 m/min.
steam feed pressure at the nozzle: 7.5 bars
escape pressure in the closed chamber 52: 3.3 bars
rate of output of the pack: 9.75 m/min.

An elongated pack is obtained, substantially cylindrical in configuration, with a specific weight of about 0.550 g/cc, with a peripheral surface that is uniform and smooth. The load required to break the cohesion of the pack is equivalent to the weight of a product length substantially equalling 2m.

EXAMPLE 7

With the device of FIG. 2 having a tubular texturizing chamber diameter of 4 mm, six lengths of polyhexamethylene adipamide (nylon 66), 78 dtex/23 strands, are texturized under the following conditions:
texturizing fluid: saturated steam
rate of yarn feed: 500 m/min.
steam feed pressure at the nozzle: 8 bars
escape pressure in the closed chamber 52: 3 bars
rate of output of the pack: 6 m/min.

There is obtained an elongated pack which is substantially cylindrical, with diameter equal to 4mm and specific weight about 0.300 g/cc. The load necessary for breaking the cohesion of the pack is equivalent to the weight of a product length of 12m.

EXAMPLE 8

With the device of FIG. 2 with the diameter of tubular texturizing chamber 46 being 4mm, as in example 1, eight lengths of 210 dtex/34 strand yarn are texturized. The texturizing fluid is saturated steam. The operating conditions are the following:
rate of yarn feed: 500 m/min.
steam feed pressure at the nozzle: 8.75 bars
escape pressure in the closed chamber 52: 3.3 bars
output rate of the pack: 30 m/min.

An elongated pack is obtained whose section is substantially elliptical with axes respectively 3 and 4mm. The specific weight of the pack is about 0.31 g/cc and the load required for breaking the cohesion is equivalent to the weight of a product length substantially of 1.20m.

In examples 5, 6, 7 and 8 the pack presents a specific weight that is greater than the specific weight of packs heretofore known, which for polyamide yarns is generally between 0.1 and 0.25 g/cc.

Examples 1 through 4 are illustrative of the process of the present invention and the results obtained with the apparatus of the present invention, and examples 5 through 8 are illustrative of the quality, configuration and exterior appearance of the pack produced by the process and apparatus of the present invention. Thus, from examples 5 through 8 the elongated pack textile product of the present invention can be seen to constitute a viable product capable of direct delivery to textile manufacturers, which pack is extremely stable and resistant to forces which might cause deformation in order to maintain the quality of easy separation of the texturized yarns therefrom.

In accordance with the present invention, the yarns 14 to be treated in the texturizing device 10 are maintained separated as they enter the texturizing chamber 46, and the separation of the yarns prior to texturizing may be accomplished by devices disposed upstream of the texturizing device as well as by the tubular channels 44 defined in the inlet of the conduit 42. The tubular channels 44, however, are extremely effective in assuring that the yarns 14 enter the texturizing chamber or space 46 separately. That is, the tubular channels 44 assure that the yarns 14 are separated at the entrance into the texturizing chamber, and the resultant pack 18 is thus formed of a plurality of yarns 14, each of which is given a specifically spaced position within the pack substantially along the generatrix of the texturizing chamber 46. Thus, adjacent yarns are able to become entangled only to a minimum degree and separation of the yarns after texturizing is facilitated.

The number of yarns 14 which may be treated in accordance with the process and apparatus of the present invention is a function of both the titre of the yarns and the dimensions of the texturizing device 10; however, in practice the number of yarns to be treated is advantageously between 4 and 8 but the number may be considerably higher. Preferably, the yarns 14 to be treated are of substantially the same titre, less than 200 dtex and the yarns are fed at substantially the same speed to the texturizing device.

From examples 5 through 8 it can be seen that the rupture strength of the elongated pack of texturized yarns corresponds to a length of the pack greater than one meter and that when polyamide yarns are treated, the specific weight is greater than 0.3 g/cc.

When the texturized yarns from pack 18 are separated, the yarns are advantageously wound simultaneously. Each yarn may be wound separately on a winding support; however, it is preferably after separation of the yarns to assemble the yarns in one or several groups with each group of yarns wound on the same support, preferably in parallel.

When it is desired to separate the yarns at some time after texturizing, the pack produced at the output of the texturizing device is collected in a skip or can normally provided with a reciprocating movement. The pack is thus temporarily stored in the skip or can, and when desired, the pack is transported to a winding machine and the pack is spread out and the yarns are separated on lifting devices such as those shown in FIG. 1. The yarns are finally separated at a comb and assembled and wound separately each on a support or wound separately on the same support. When it is desired to provide continuous separation of the pack 18 after texturizing, the pack is delivered to belt 25 as illustrated in FIG. 1. The yarns are separated by lift devices 26 and comb 30 and then assembled, relaxed and wound on a single support.

The discontinuous or continuous separation of the yarns from pack 18 depends on the resultant use of the yarns; and, thus, where a dying operation is desired, it is preferably to utilize discontinuous separation and winding of the yarns since the dying operation can be more effectively performed on the pack 18. For other uses such as a grey yarn, it is desired to collect the yarn directly on spools; and, thus, the yarns are continuously separated and wound. Whether the yarns are separated either continuously or discontinuously the winding of the yarns can be effected without tension in order to preserve the bulk of the texturized yarns; however, of course, the yarns may be wound under tension. If the yarns are wound under tension, the curled or crimped appearance of the yarns will be temporarily eliminated with the curled or crimped appearance manifesting itself again during subsequent thermal treatments. Thus, the yarns produced in accordance with the present invention are provided with latent texturization.

The above described latent texturization is extremely advantageous for textile manufacturing in that the bulk and elasticity of yarns present problems when it is desired to knit, weave or stitch a background utilizing texturized yarns. In order to avoid irregular appearance in the finished article, the bulkiness and elasticity of the yarns must be taken into account especially with respect to tightening and tension. Thus, it is advantageous to be able to work with a yarn such as that provided by the present invention whose texturizing, curl and elasticity are in a latent state such that the yarn has substantially the appearance of untreated yarns. In order to reveal the texturization of the yarns, the finished article is treated to provide relaxation and the texturized yarn it thus returned to its previously texturized state.

The winding tension required to separate and wind the yarns from the pack 18 in order to eliminate the texturized appearance thereof is a function of the curl or crimp, the rate of winding, the titre of the yarns and the strength and structure of the yarn; for those yarns having a great elongate-to-rupture, the winding tension may cause a slight drawing; however, this drawing will not harm the final appearance of the yarn after revelation. The winding tension to be utilized is preferably between 20 and 50 g. and the revelation of the yarns can be effected in the course of thermal treatments for finishing or dying the finished article containing the yarns.

The yarns produced according to the present invention may be utilized for the manufacture of fabrics with or without nap, knits, nonwoven fabrics for use as floor coverings, wall coverings, furniture, and clothing such as outer garments, under clothing and hosiery as well as other articles.

In particular, with the yarns of the present invention having latent texturization obtained by winding under tension, regular or fancy effects can be obtained, and it is possible to weave or knit these yarns, which, essentially, act like flat yarns, to provide less defects than occur in the weaving or knitting of elastic, bulky yarns. Furthermore, there is greater uniformity of reaction of the yarns at the time of revelation on the woven or knitted article. Articles that are made with the yarns of the present invention have an excellent feel; and, moreover, the pucker phenomenon is practically eliminated in the knit products.

The process and apparatus of the present invention may be utilized with any thermoplastic yarns of the same or different titre, of the same or different nature, of the same or different section, matte or glossy, colored or natural. The term thermoplastic yarns includes yarns obtained by spinning or extrusion of polymers, copolymers, graft polymers, mixtures thereof, mixtures thereof having constituents of the same kind (but not the same properties and/or viscosity) or of a different kind, as well as yarns with heterogeneous structure in which the components are either adhering, concentric, or interdispersed, the yarns being obtained by spinning of filamentous products as well as those obtained by spinning or simultaneous extrusion through a single spinneret of products of different nature and appearance, whether they have the same cross section or not. Similarly, the present invention is applicable to simple yarns as well as to twisted or assembled yarns which are presented in continuous form or as spun materials from filaments that are preponderantly thermoplastic.

What is claimed is:

1. A textile product formed of a plurality of texturized, continuous filament, polyamide yarns each having a titre of less than 200 dtex, which are configured into a cylindrical pack having a substantially smooth, continuous peripheral surface, said cylindrical pack having sufficient cohesion to resist rupture until stressed by a weight in excess of a predetermined weight, said predetermined weight being at least the weight of one meter of the pack when the pack has a specific weight greater than 0.3 grams per cubic centimeter and wherein said yarns composing said pack separate into parallel strands, when said pack is stressed with a force in excess of said predetermined weight but less than a force required to break the yarns.

2. The product of claim 1, wherein the pack includes four to eight of said texturized yarns and wherein each yarn is a multifilament yarn.

* * * * *